W. W. DOUGLAS AND S. L. BAILEY.
LUBRICATION OF PISTONS.
APPLICATION FILED JUNE 2, 1920.
1,437,585.
Patented Dec. 5, 1922.
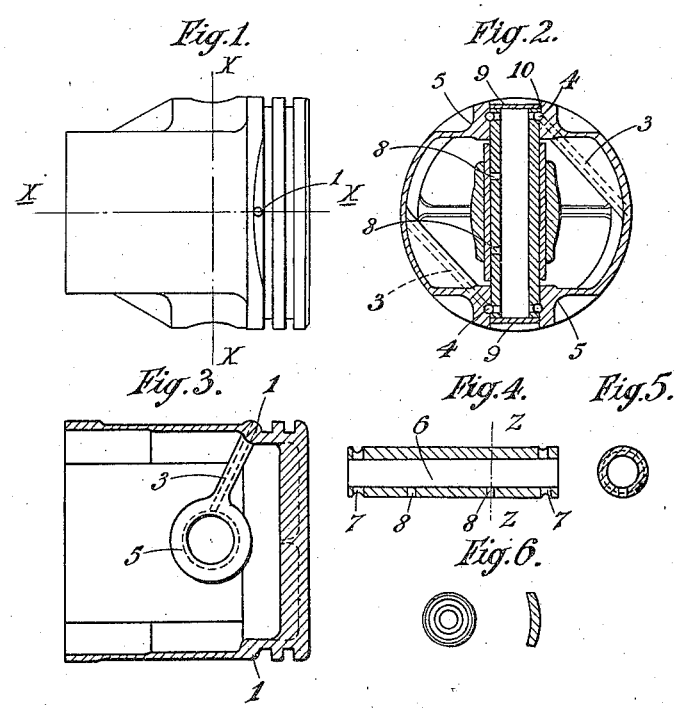

Patented Dec. 5, 1922.                                                            1,437,585

UNITED STATES PATENT OFFICE.

WILLIAM WILSON DOUGLAS, OF BRISTOL, AND STEPHEN LESLIE BAILEY, OF STAPLE HILL, ENGLAND, ASSIGNORS OF ONE-THIRD TO DOUGLAS' MOTORS LIMITED, OF BRISTOL, ENGLAND.

LUBRICATION OF PISTONS.

Application filed June 2, 1920. Serial No. 386,027.

(GRANTED UNDER THE PROVISIONS OF THE ACT OF MARCH 3, 1921, 41 STAT. L., 1313.)

*To all whom it may concern:*

Be it known that we, WILLIAM WILSON DOUGLAS and STEPHEN LESLIE BAILEY, both subjects of the King of Great Britain, residing, respectively, at Hanham Road, Kingswood, Bristol, in the county of Gloucester, England, and Park View, Staple Hill, in the county of Gloucester, England, have invented certain new and useful Improvements in and Connected with the Lubrication of Pistons (for which we have filed application in England, March 26, 1919, Patent No. 138,478), of which the following is a specification.

This invention relates to the lubrication of pistons of the kind provided with a groove on the outside, communicating with a hollow gudgeon pin to permit of oil being collected in the groove and passed to the said pin during the reciprocating motion of the piston.

According to the present invention lubricating oil collected from the cylinder walls is circulated through a passage way, leading from the top of the piston diagonally to an annular channel, or groove, cut internally of the gudgeon pin boss.

In order that the invention may be clearly understood and readily carried into effect, reference may be had to the accompanying drawings of which:—

Figure 1 is a side elevation of a piston constructed according to this invention.

Figure 2 is a section on line X X of the piston shown by Figure 1 having the small end of the connecting rod fitted in position.

Figure 3 is a section on line X X of the piston shown by Figure 1.

Figure 4 is a longitudinal sectional view of the gudgeon pin constructed according to this invention.

Figure 5 is a section on line Z Z of Figure 4, and

Figure 6 is a front and end view of the gudgeon pin cap.

According to a convenient embodiment of this invention as applied to an internal combustion engine for lubrication of the piston and connecting rod end, the piston is constructed and made with grooves 1, formed by bevelling away the side of the piston ring groove on only at diametrically opposite sides of the piston and preferably in front of the first piston ring at points of the greatest piston thrusts, into which grooves 1, the said ring, on the outward stroke collects the lubricating oil from the cylinder wall. The oil thus collected is forced into a tube or duct 3 made or cast in the piston, and leading from the top of the piston, diagonally in the case of slipper pistons to an annular channel or groove 4 cut or formed internally of each of the gudgeon pin bosses 5. From this channel the lubricating oil passes into the gudgeon pin 6, which is made hollow and in which is established an oil receptacle or bath by the collection therein of the oil from the cylinder walls. The oil enters the hollow pin by ways or means of a hole 7 in the underside over the channel 4 in each boss 5, and passes out through similar holes 8 along the pin into the small end parts of the connecting rod.

The caps 9 first being made concave thus reducing their diameter and permitting their insertion in a groove or recess cut in the gudgeon pin bosses in which they are securely retained by being expanded by flattening and thus forming oil tight caps, or by any other known form of gudgeon pin fastening for the gudgeon pin are positioned by being sprung in the grooves 10 in the gudgeon pin bosses 5, and thus form oil tight caps for the ends of the gudgeon pin.

By means of this improved construction and design of the piston the force of the piston stroke is used to obtain positive lubrication of the small end and its bearings directly the engine starts.

What we claim and desire to secure by Letters Patent of the United States is:—

1. Means for lubricating engine pistons within their cylinders comprising in combination with a piston, a hollow gudgeon pin, end bosses for said pin, at least one of said bosses having an annular groove, and said piston having a passageway leading downwardly and diagonally from its top to said annular groove and means for admitting lubricating fluid into the gudgeon pin from said groove.

2. Means for lubricating engine pistons within their cylinders comprising in combination with a piston, a gudgeon pin, end bosses for said pin, at least one of said bosses having an annular groove, said piston having an inclined passageway leading from its top to said groove, and said pin having an opening therein registering with said groove.

3. Means for lubricating engine pistons within their cylinders comprising in combination with a piston having the usual ring groove, a hollow gudgeon pin, end bosses for said pin having grooves therein, external grooves in said piston formed by beveling away the side of the ring groove, a duct in the piston in communication with said bosses and leading from said last mentioned grooves in the exterior of the piston, and a connecting rod upon said gudgeon pin, said pin having holes therein adjacent the bosses and the connecting rod.

4. Means for lubricating engine pistons within their cylinders comprising in combination, a piston having beveled grooves and a duct leading from the piston ring groove, a hollow gudgeon pin having bosses, an internal groove in each of the said bosses in communication with said duct, a connecting rod, passages along the pin leading towards the small end parts of the connecting rod and caps fitted to the gudgeon pin bosses.

WILLIAM WILSON DOUGLAS.
STEPHEN LESLIE BAILEY.